United States Patent [19]

Sapir

[11] Patent Number: 5,282,040
[45] Date of Patent: Jan. 25, 1994

[54] APPARATUS FOR OPERATING A FILM CAMERA

[76] Inventor: Itzhak Sapir, 14 Ganei Binyamina, Binyamina 50 300, Israel

[21] Appl. No.: 935,017

[22] Filed: Aug. 25, 1992

Related U.S. Application Data

[63] Continuation-in-part of Ser. No. 696,778, May 7, 1991, abandoned.

[51] Int. Cl.⁵ .................. H04N 5/30; H04N 5/225
[52] U.S. Cl. .................................. 358/209; 358/909
[58] Field of Search ............... 354/155, 156, 159, 219, 354/286, 286.12, 75, 76; 358/209, 909; 359/675; H04N 5/225, 5/30

[56] References Cited

U.S. PATENT DOCUMENTS

| | | | |
|---|---|---|---|
| 4,303,322 | 12/1981 | Someya | 354/31 |
| 4,314,752 | 2/1982 | Ishizaka et al. | 354/286 |
| 4,437,750 | 3/1984 | Ikari | 354/155 |
| 4,591,234 | 5/1986 | Hamanishi | 359/675 |
| 4,609,272 | 9/1986 | Yokota et al. | 354/225 |
| 4,742,369 | 5/1988 | Ishii et al. | 354/441 |
| 4,770,508 | 9/1988 | Yamada et al. | 359/675 |
| 4,814,811 | 3/1989 | Saito et al. | 354/412 |
| 4,823,199 | 4/1989 | Sakakibara et al. | 358/335 |
| 4,862,293 | 8/1989 | Saito et al. | 360/35.1 |
| 4,885,837 | 12/1989 | Eshima et al. | 29/564 |
| 4,916,476 | 4/1990 | McGarvey | 354/432 |
| 4,929,972 | 5/1990 | Anderson et al. | 354/75 |
| 4,933,780 | 6/1990 | Wash et al. | 360/1 |
| 4,949,117 | 8/1990 | Van Heyningen et al. | 354/412 |
| 4,953,029 | 8/1990 | Morimoto et al. | 358/229 |
| 5,053,794 | 10/1991 | Benz | 354/79 |

FOREIGN PATENT DOCUMENTS 2-101447  4/1990  Japan ........................ H04N 5/225

*Primary Examiner*—Joseph Mancuso
*Assistant Examiner*—Tuan V. Ho
*Attorney, Agent, or Firm*—Abelman Frayne & Schwab

[57] ABSTRACT

Apparatus for operating a conventional film camera having a conventional film back and defining an image plane, in an electronic mode of operation including a video module insertable inside a camera in the place of a conventional film and forward of the conventional film back and comprising a detector array disposed in the image plane and electronic circuitry associated with the detector array for still video image acquisition.

16 Claims, 5 Drawing Sheets

APPARATUS FOR OPERATING A FILM CAMERA

This application is a continuation-in-part of the application Ser. No. 07/696,787, filed May 7, 1991, now abandoned.

FIELD OF THE INVENTION

The present invention relates to photography and more particularly to still video photography.

BACKGROUND OF THE INVENTION

Still video photography is well known. Electronic still cameras are described inter alia in the following U.S. Pat. Nos. 4,742,369; 4,929,972; 4,933,780 and 4,949,117.

Apparatus for converting a conventional still camera employing film for operation as an electro-optical camera is described inter alia in the following U.S. Pat. Nos. 4,953,029; 4,916,476; 4,862,293; 4,855,837; 4,823,199; 4,814,811 and 4,303,322.

Generally speaking, conversion of a conventional still camera to video operation is accomplished by replacing the camera back or adding video apparatus to the conventional back. The prior art generally employs optical conversion of the image at the camera focal plane to a smaller image which is sensed by a pick-up device spaced from the focal plane.

A second prior art approach generally employs the replacement of the still camera back with a video back which includes an image sensor placed at the focal plane and electronic circuitry to support it.

SUMMARY OF THE INVENTION

The present invention seeks to provide improved apparatus for operating a conventional film camera in an electronic mode of operation.

There is thus provided in accordance with a preferred embodiment of the present invention apparatus for operating a conventional film camera having a conventional film back and defining an image plane, in an electronic mode of operation including a video module insertable inside a camera in the place of a conventional film and forward of the conventional film back and comprising a detector array disposed in the image plane and electronic circuitry associated with the detector array for still video image acquisition.

There is also provided, in accordance with a preferred embodiment of the present invention, apparatus for operating a conventional film camera, defining an image plane, in an electronic mode of operation. The apparatus includes a video module insertable in a camera in the place of a conventional film and comprising a detector array disposed in the image plane for still video image acquisition.

In accordance with a preferred embodiment of the invention, the apparatus also comprises image storage apparatus, image processing circuitry and an electrical power source. In accordance with one embodiment of the invention, at least one of the image storage apparatus, the image processing circuitry and the electrical power source are located in the video module. According to another embodiment of the invention, the image storage apparatus as well as image processing circuitry and a suitable power source are located in an auxiliary module, separate from the video module.

The auxiliary module may be mounted on the outside of the camera or separately carried by the user. Communication between the video module and the auxiliary module may be provided by a wireless link or alternatively via suitable electrical conductors. As a further alternative, the auxiliary module may include two parts, one mounted on the outside of the camera and one separately carried by a user. Communication between the two parts may be by either wireless or wired links.

The apparatus also preferably includes apparatus for outputting video directly to utilization apparatus, such as a conventional video display or television.

Optionally, the apparatus includes a field of view reducing adapter insertable between a lens housing and a camera housing of said conventional film camera. The field of view reducing adapter typically comprises a lens which, when said adapter is located within said camera, is located between a lens of said conventional film camera and said detector array.

Additionally, the apparatus can include a field of view expanding adapter insertable between a viewfinder of said conventional film camera and an eye of a viewer. The field of view expanding adapter typically comprises a lens operative to expand the field of view reduced by the field of view reducing adapter.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
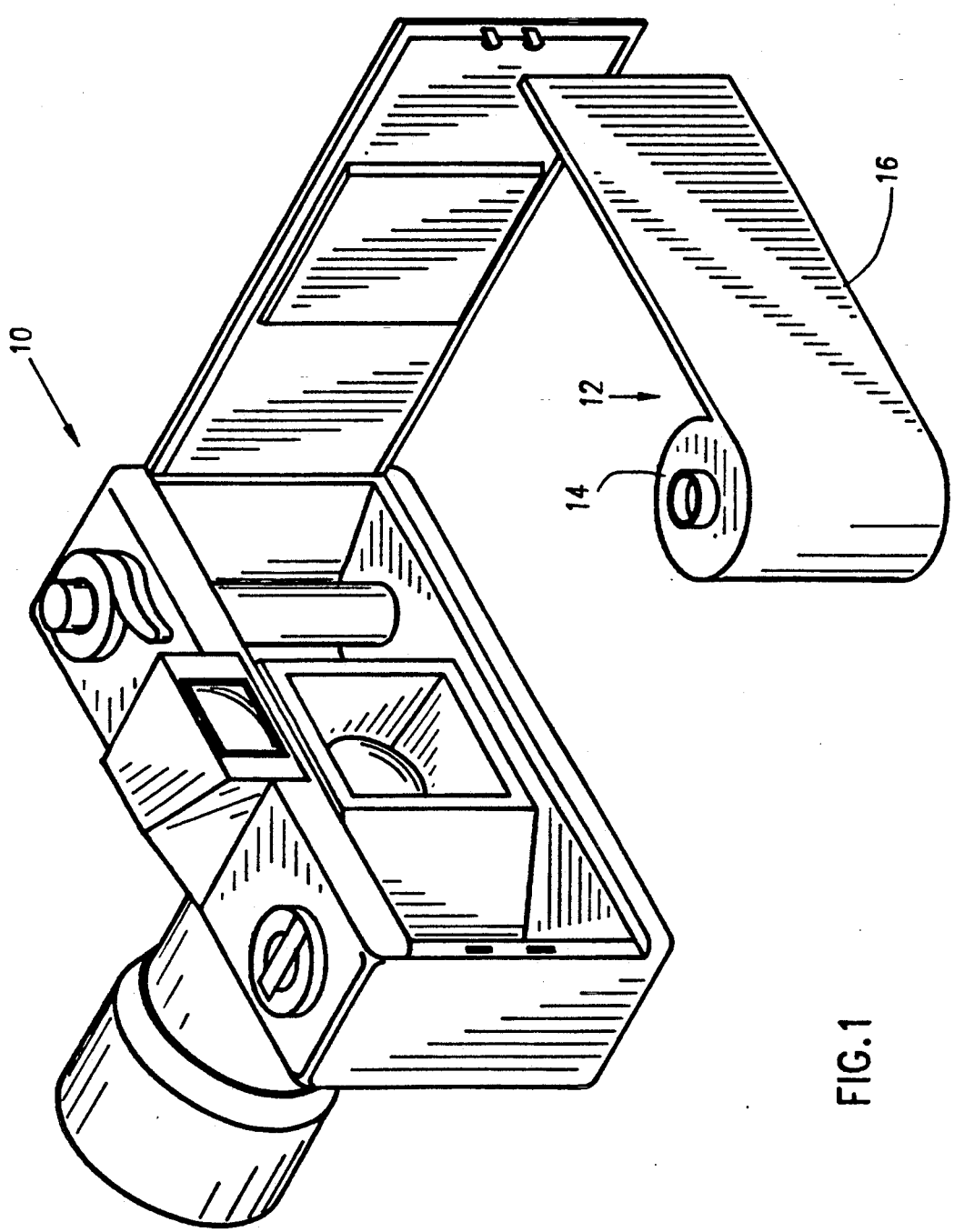
FIG. 1 is a pictorial illustration of the still video apparatus of the present invention in association with a conventional film camera.

Reference is now made to FIG. 1, which illustrates still video apparatus of the present invention in association with a conventional film camera. As seen in FIG. 1, the camera 10 may be any suitable film camera such as a 35 mm single lens reflex camera. The still video apparatus of the invention comprises a video module 12, which is preferably in the overall configuration of conventional film for which the camera 10 is designed. Thus it can be seen that in the embodiment of FIG. 1, the video module includes a first portion 14 which is shaped generally like a 35 mm film cartridge and a second portion 16, which is shaped generally like a section of film extending outwardly therefrom and lying in the focal plane of the camera.

It is a particular feature of the present invention that the video module 12 includes a detector array, such as a CCD array, which is disposed in the focal plane of the camera.

It is noted that no mechanical or electric linkage between the shutter or film drive of the conventional camera 10 and the video module 12 need necessarily be provided, inasmuch as the video module 12 may record an image whenever the shutter is opened and may be programmed to read out or store the image independently of the operation of the shutter and film drive. Alternatively any suitable interconnection between the conventional camera controls and the video module 12 may be provided. An external control may also be provided to operate the image sensor circuits independently of the camera controls.

Figure 2:
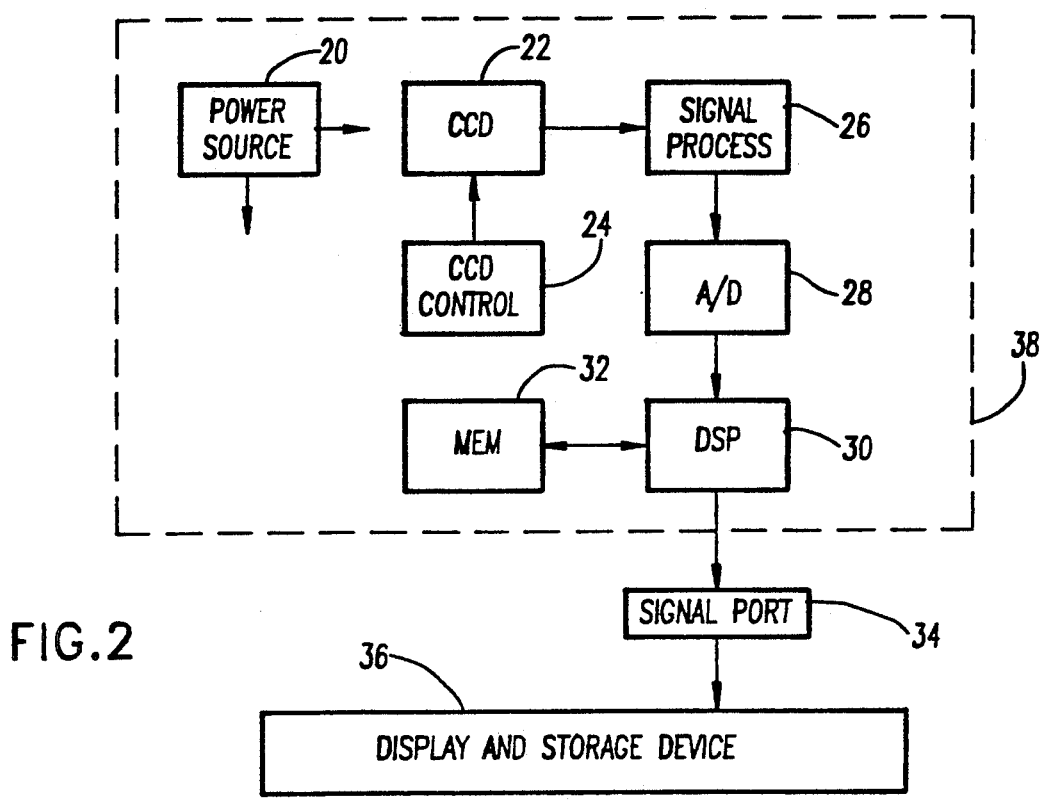
FIG. 2 is a simplified block diagram illustration of a still video system constructed and operative in accordance with one preferred embodiment of the invention.

Reference is now made to FIG. 2, which illustrates typical circuitry of the still video apparatus of the present invention. A power source, such as a battery, provides electrical power for the entire apparatus. Preferably, the image plane detector array comprises a CCD array operated by a CCD control circuit 24. The output of the CCD array 22 is supplied to signal processing circuitry 26, which in turn outputs via an A/D converter 28 to digital signal processing circuitry 30, which stores received images in a memory 32. Circuitry 26 and/or circuitry 30 may be operative for carrying out conventional image processing functions, such as changing the sensitivity of the CCD output as by division or multiplication of the CCD output values, and stretching or compressing the contrast boundaries of the CCD.

Image outputs may be provided via a suitable signal port 34 to display and/or storage devices 36, such as video terminals, video recorders and televisions.

In accordance with one embodiment of the invention, all of the circuitry and apparatus indicated within block 38 may be contained within the video module, which is preferably insertable in camera 10 without requiring any structural modification to the camera.

Figure 3:
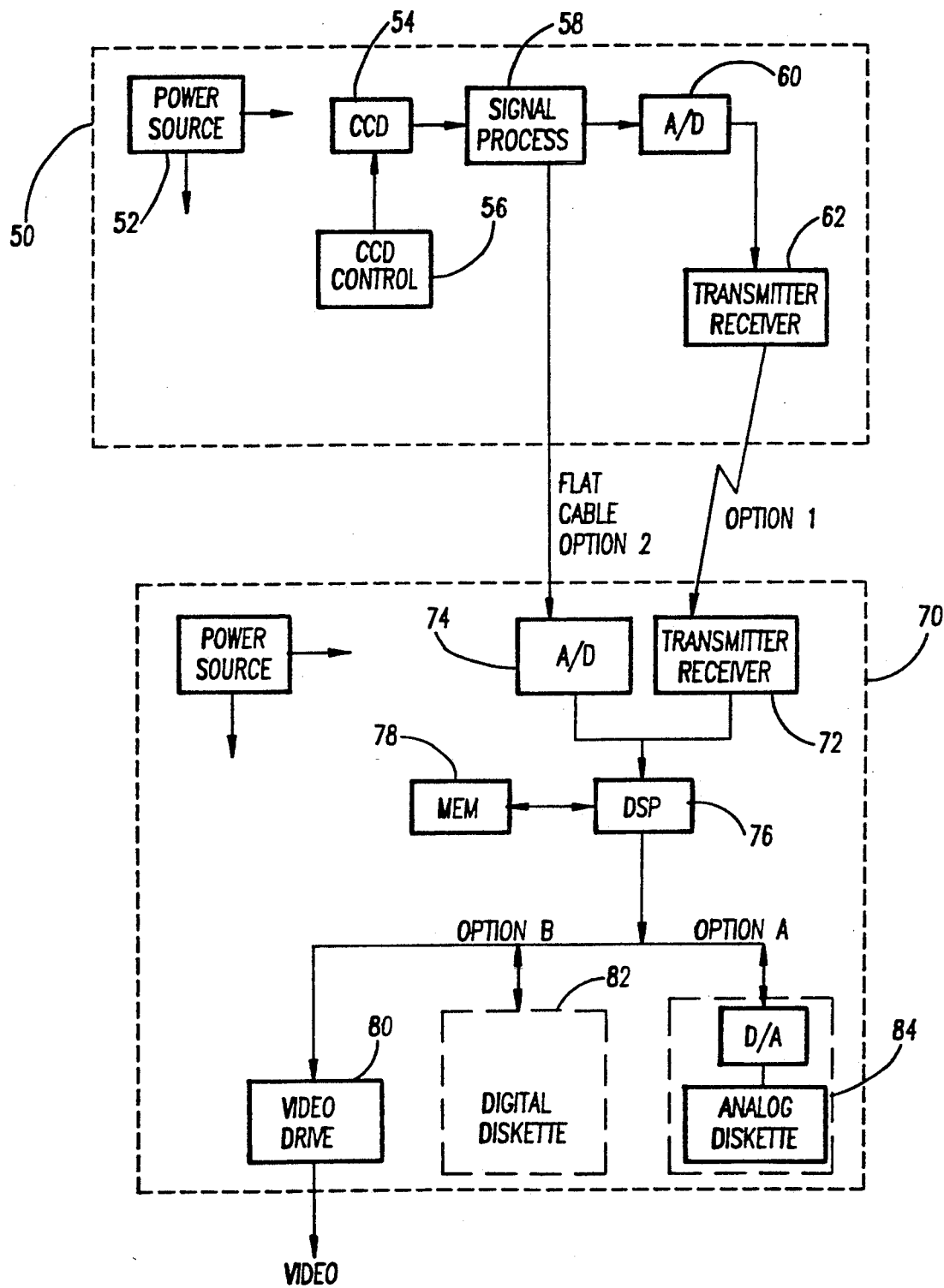
FIG. 3 is a simplified block diagram illustration of a still video system constructed and operative in accordance with another preferred embodiment of the invention.
Figure 4:
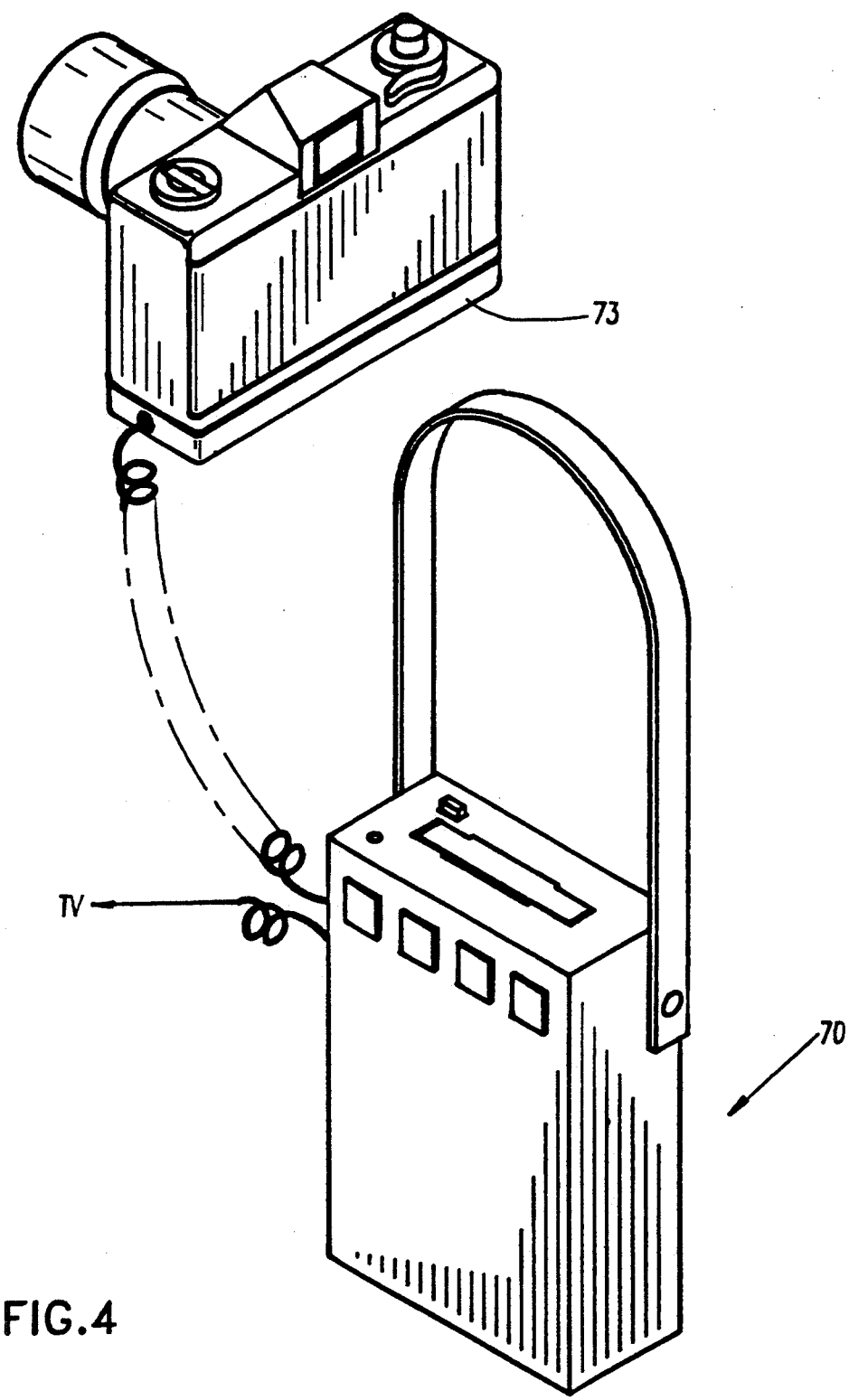
FIG. 4 is a pictorial illustration of a still video system corresponding to the embodiment of FIG. 3.

Reference is now made to FIGS. 3 and 4, which illustrate an alternative embodiment of the apparatus of the present invention wherein part of the circuitry and apparatus indicated within block 38 is incorporated in one or more auxiliary modules.

In the embodiment of FIGS. 3 and 4, the video module is indicated by reference numeral 50 and preferably includes a power supply 52, a CCD array 54, CCD control circuitry 56 and signal processing circuitry 58. According to one variation it may also include an A/D converter 60 and transceiver 62. Alternatively, the A/D converter 60 and transceiver 62 may be eliminated.

An auxiliary module 70 is also provided in the embodiment of FIGS. 3 and 4. Where a wireless link is provided with the video module 50, a transceiver 72 is provided, preferably in a housing 73 mounted at the bottom of the camera housing. In such a case, the auxiliary module 70 comprises two elements.

Alternatively, where transceivers 62 and 72 are not provided, a cable connection, such as via a flat cable, may be provided between the signal processor 58 in video module 50 and an A/D converter 74 in auxiliary module 70. The output from either A/D converter 74 or transceiver 72 is supplied to digital signal processing circuitry 76 which interfaces with a memory 78, such as a solid state memory.

The output of digital signal processing circuitry 76 is supplied either directly to a video drive circuit 80, which converts the signals to conventional format, or alternatively to either a digital diskette drive 82 or via a digital to analog converter 84 to an analog diskette drive 84. The auxiliary module 70 may include facilities and controls to enable storage control and editing of the images received thereby.

Figure 5:
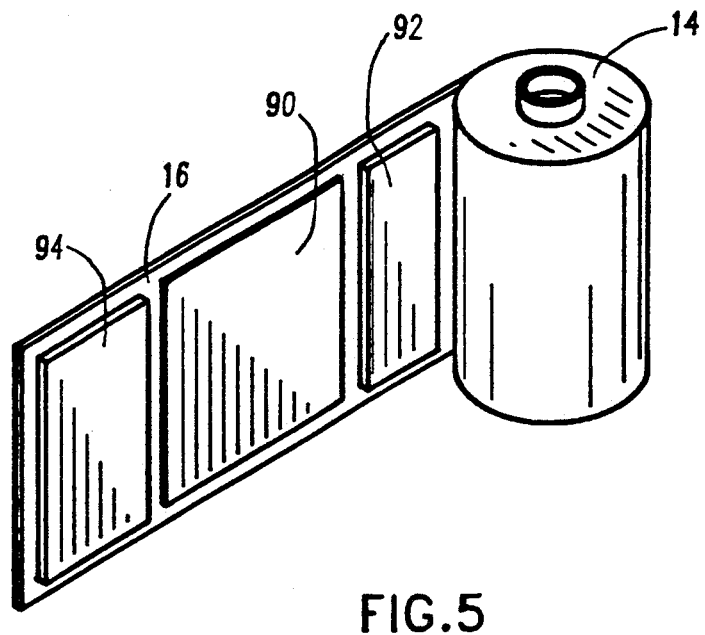
FIG. 5 is a pictorial layout illustration of the video module employed in accordance with a preferred embodiment of the present invention.

Reference is now made to FIG. 5, which illustrates a typical configuration of a video module. The video module preferably includes a CCD array 90 as well as surface mounted electronics 92 and 94, which may include memory as well as control and processing electronics. Portion 14 may include a battery as well as additional electronics.

Figure 6:
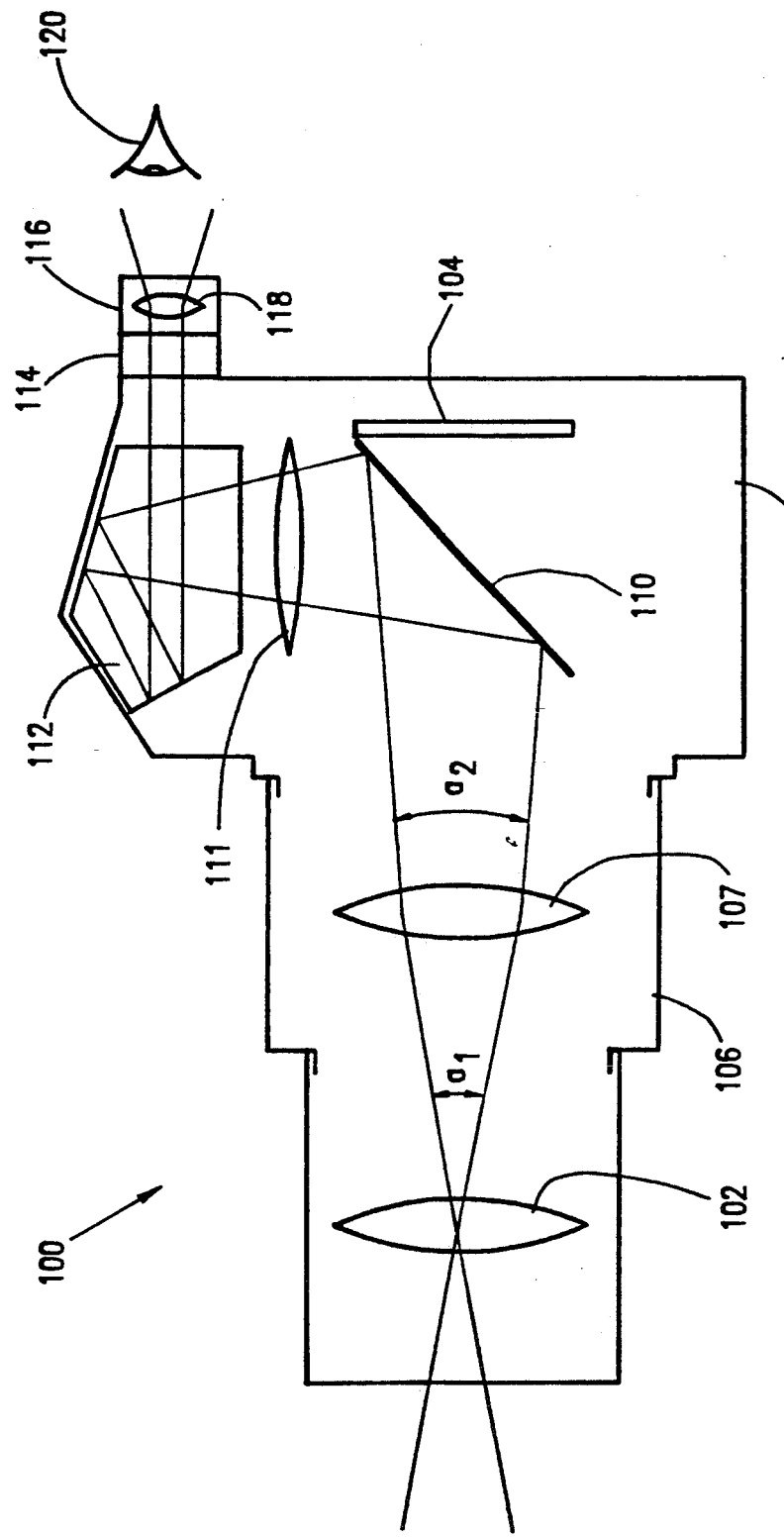
FIG. 6 is a schematic illustration of an alternative embodiment of the present invention.

Reference is now made to FIG. 6 which illustrates an alternative embodiment of the present invention utilizing a relatively small detector array.

In this alternative embodiment, the camera, labeled 100, comprises an interchangeable lens 102 for focusing light from a scene to be detected, an insertable detector array 104 similar to but smaller than detector array 22, and a field of view reducing adapter 106, typically comprising a lens 107, for reducing the field of view of lens 102 to match that of the small detector array 104. Detector array 104 typically is a $\frac{1}{2}$" CCD whose inner diameter is typically 0.43 inches.

The field of view reducing adapter 106 typically is connectable to a camera housing 108 housing detector array 104, typically via standard camera parts changing methods. The field of view reducing adaptor 106 is typically placed such that the lens 106 is located between lens 102 and detector array 104. As shown in FIG. 6, lens 107 is operative to change the field of view $a_1$ of the lens 102 to a smaller field of view $a_2$. For a 50 mm lens, $a_1$ is typically 47 degrees and, for a CCD of $\frac{1}{2}$" format, $a_2$ is approximately 16 degrees. It will be appreciated that the value of $a_2$ is dependent on the optical design of the adapter 106 and lens 107.

Camera 100 typically also comprises a mirror 110, selectively locatable between the adapter 106 and the detector 104, a focusing screen 111 and a prism 112 for providing an image of the scene to be detected in a viewfinder 114. Due to the field of view reducing adapter 106, the image seen in the viewfinder 114 typically has a small field of view.

Therefore, camera 100 can optionally comprise a field of view expanding adapter 116, typically comprising a lens 118, connectable between the viewfinder 114 and an eye 120 of a viewer, for expanding the field of view of the scene to a standard field of view.

It will be appreciated that adapters 106 and 116 are typically insertable into a conventional film camera, such as camera 10.

It will be appreciated by persons skilled in the art that the present invention is not limited by what has been particularly shown and described hereinabove. Rather the scope of the present invention is defined only by the claims which follow:

I claim:

1. Apparatus for operating a conventional film camera having a conventional film back and defining an image plane, in an electronic mode of operation including a video module insertable inside a camera in the place of a conventional film and in front of the conventional film back and comprising a detector array disposed in the image plane and electronic circuitry controlling the operation of the detector array and including image storage means for receiving image signal from said detector array, image processing circuitry for processing said image signal and an electric power source and wherein said detector array is mounted on said video module and arranged to lie in the image plane of the camera when the video module is seated in the camera in place of conventional film.

2. Apparatus according to claim 1 and wherein at least one of the image storage apparatus, the image processing circuitry and the electrical power source is located in the video module.

3. Apparatus according to claim 1 and wherein the image storage means and the image processing circuitry are located in an auxiliary module, separate from the video module.

4. Apparatus according to claim 3 and wherein said auxiliary module is mounted on an outside surface of the camera.

5. Apparatus according to claim 3 and wherein said auxiliary module is arranged to be separately carried by the user.

6. Apparatus according to claim 3 and also comprising communication means for providing communication between the video module and the auxiliary module.

7. Apparatus according to claim 6 and wherein said means for providing communication comprises a wireless link.

8. Apparatus according to claim 3 and wherein said auxiliary module comprises two parts, one mounted on the outside of the camera and one separately carried by a user.

9. Apparatus according to claim 8 and also comprising auxiliary module communication means interconnecting the two parts of the auxiliary module.

10. Apparatus according to claim 9 and wherein said auxiliary module communication means comprises a wireless link.

11. Apparatus according to claim 9 and wherein said auxiliary module communication means comprises a wire link.

12. Apparatus according to claim 1 and also comprising means for outputting video data directly to utilization apparatus.

13. Apparatus according to claim 1 and also including a field of view reducing adapter insertable between a lens housing and a camera housing of said conventional film camera.

14. Apparatus according to claim 13 and also including a field of view expanding adapter insertable between a viewfinder of said conventional film camera and an eye of a viewer.

15. Apparatus according to claim 14 and wherein said field of view expanding adapter comprises a lens.

16. Apparatus according to claim 13 and wherein said field of view reducing adapter comprises a lens which, when said adapter is located within said camera, is located between a lens of said conventional film camera and said detector array.

* * * * *